United States Patent [19]

White

[11] Patent Number: 5,319,587

[45] Date of Patent: Jun. 7, 1994

[54] COMPUTING ELEMENT FOR NEURAL NETWORKS

[75] Inventor: Stanley A. White, San Clemente, Calif.

[73] Assignee: Rockwell International Corporation, Seal Beach, Calif.

[21] Appl. No.: 390,049

[22] Filed: Aug. 7, 1989

[51] Int. Cl.$^5$ .............................................. G06F 7/38
[52] U.S. Cl. ................................... 364/736; 395/27; 307/201
[58] Field of Search .................. 364/736, 513, 807; 307/201; 395/27

[56] References Cited

U.S. PATENT DOCUMENTS

| | | | |
|---|---|---|---|
| 3,950,733 | 4/1976 | Cooper et al. | 307/201 |
| 4,315,319 | 2/1982 | White | 364/553 |
| 4,507,741 | 3/1985 | White | 364/554 |
| 4,843,583 | 6/1989 | White et al. | 364/724.19 |
| 4,918,618 | 4/1990 | Tomlinson, Jr. | 365/807 |
| 4,920,499 | 4/1990 | Skeirik | 364/513 |
| 4,967,369 | 10/1990 | Jourjine | 364/513 |

FOREIGN PATENT DOCUMENTS 1262538 10/1986 U.S.S.R. ........................ 364/807

OTHER PUBLICATIONS

Rippmann, "An Introduction to Computing with Neural Nets", IEEE ASSP Magazine, pp. 4–22 Apr. 1987.

Primary Examiner—Dale M. Shaw
Assistant Examiner—Kee M. Tung
Attorney, Agent, or Firm—H. Fredrick Hamann; George A. Montanye; Tom Streeter

[57] ABSTRACT

A computing element for use in an array in a neural network. Each computing element has K (K>1) input signal terminals, K input backpropagated signal terminals, K output backpropagated signal terminals and at least one output terminal. The input terminals of the computing element located in row i, column j of the array of computing elements receive a sequence of concurrent input signals on K parallel input lines representing a parallel input signal $S_{ij}$ having vector elements $(s_{ij1}, s_{ij2}, s_{ij3}, \ldots, s_{ijk})^T$. The K input backpropagated signal terminals are coupled to receive an m-dimensional (m<K) backpropagated signal vector characterized to provide a measure of the performance error of the computing element. The computing element comprises a weighting function means responsive to the concurrent input signal $S_{ij}$ for computing a K-dimensional weighting coefficient and a scalar activation signal $u_{ij}$ by computing a K-dimensional weighting-coefficient vector, $W_{ij} = (w_{ij1}, w_{ij2}, \ldots, w_{ijk})^T$, and by forming the vector inner product of the input signal $S_{ij}$ vector elements and the weighting-coefficient vector, $W_{ij}$. Feedback signals $x_{ijk} = w_{ijk}*p_{ij}$ are provided from the output backpropagated signal terminals where $p_{ij}$ provides a performance error of all columns of computing elements subsequent to this computing element weighted by the gain of the computing element. A nonlinear processor maps successive values of $u_{ij}$ through a nonlinear mapping function, $M_{ij}$ to provide a single-valued output signal $y_{ij}$. The nonlinear processor responds to an m-dimensional backpropagated signal vector, $X_{i,j+1} = (x_{1,j+1,p}; x_{2,j+1,p}; x_{3,j+1,p}; \ldots x_{m,j+1,p})^T$ characterized to provide a measure of the performance error of all computing elements subsequent to the computing element. Vector $X_{i,j+1}$ comprises the pth member of all backpropagated error vectors from the computing elements of column j+1.

24 Claims, 4 Drawing Sheets

| CLOCK | | | | | | |
|---|---|---|---|---|---|---|
| $s_{ij1}$ (GIVEN) | 2 | 3 | 4 | 3 | 3 | |
| $p_{ij}$ (GIVEN) | 2 | 1 | 2 | 1 | -2 | |
| $q_{ij1} = s_{ij1} * p_{ij}$ | 4 | 3 | 8 | 3 | -6 | |
| $\Sigma = w_{ij1} + q_{ij1}$ | 8 | 11 | 19 | 22 | 16 | |
| $w_{ij1} = z^{-1} * \Sigma$ | 4 | 8 | 11 | 19 | 22 | 16 |
| $x_{ij1} = w_{ij1} * p_{ij}$ | 8 | 8 | 22 | 19 | -44 | |
| $d_{ij1} = w_{ij1} * s_{ij1}$ | 8 | 24 | 44 | 57 | 66 | |

(GIVEN) = INITIAL CONDITION; C1 = 1

FIG. 6

COMPUTING ELEMENT FOR NEURAL NETWORKS

BACKGROUND OF THE INVENTION

1. Field of the Invention

The present invention relates to adaptive signal processors for signal classification, identification and enhancement.

2. Prior Art

U.S. Pat. No. 4,315,319, "Nonlinear Signal Processor" by inventors Stanley A. White and V. A. Vitols, issued Feb. 9, 1982 is of interest because it describes a nonlinear signal-processing technique to combat the problem of nonlinear distortion by mapping an input signal having any given amplitude-density function into a new signal with any given amplitude-density function, subject only to the constraint that the distorting mechanism be a single-valued nonlinear function, the slope of which is everywhere positive. The nonlinear signal-processing technique of that patent has been successfully applied to both speech and image-restoration problems.

U.S. Pat. No. 4,843,583 for "A Non-linear Adaptive Filter" filed Oct. 15, 1985, having a common inventor and assignee is of interest because it depicts an adaptive computation which is used in this invention.

SUMMARY OF INVENTION

A computing element for use in a neural network is described. A neural network uses an array of the invention computing elements arrayed into (i) rows and (j) columns. Each computing element has at least K (K>1) input terminals and at least one output terminal $y_{ij}$.

The input terminals for each respective computing element are coupled to receive a sequence of concurrent input signals on K parallel input lines representing a parallel input-vector signal $S_{ij}=(s_{ij1}, s_{ij2}, s_{ij3}, \ldots, s_{ijK})^T$.

Each computing element has a weighting function computational block or means that is responsive to the concurrent input signals for computing a K-dimensional weighting coefficient representing a K-dimensional weighting-coefficient vector, $W_{ij}=(w_{ij1}, w_{ij2}, \ldots, w_{ijk})^T$.

Each weighting function means also computes a scalar activation signal $u_{ij}$ by forming the vector inner product of the input vector $S_{ij}$ and the weighting-coefficient vector, $W_{ij}$. The weighting function means also provides a backpropagated vector signal $X_{ij}=p_{ij}$ times $W_{ij}$, where $p_{ij}$ is a backpropagated signal characterized to provide a performance-error signal for the computing element.

Each computing element also has a nonlinear processor or nonlinear processor means that is coupled to receive and respond to the activation signal $u_{ij}$ for mapping successive values of $u_{ij}$ through a nonlinear mapping function, $M_{ij}$, to provide a single-valued output signal, $y_{ij}$. The nonlinear processor also responds to an m-dimensional backpropagated signal vector, $X_{ij+1}=(x_{1,j+1,p}, x_{2,j+1,p}, x_{3,j+1,p}, \ldots x_{m,j+1,p})^T$ from a subsequent layer of computing elements to provide a measure of the performance error of the computing element for computing the backpropagated signal, $p_{ij}$. Each member of $X_{i,j+1}$ is the pth member of the backpropagated error vector from each computing element in column j+1.

In a more particular alternative embodiment of the invention computing element, the nonlinear processor has a memory means that is responsive to the activation signal $u_{ij}$ for computing a single-valued monotonic activation function $F(u_{ij})$. The activation function $F(u_{ij})$ is activated by successive $u_{ij}$ signals to provide corresponding scalar signals $e_{ij}$, for all ($0 \leq e_{ij} \leq 1$).

Each $e_{ij}$ signal has a value corresponding to a point at $u_{ij}$ on the distribution function curve of $F(u_{ij})$. The distribution function of a numerical-valued phenomenon has a value at its output which is equal to the probability that the sample value of the input phenomenon is less than or equal to its actual value.

In an even more particular embodiment, an inverse output distribution function means $G(e_{ij})$ responds to each $e_{ij}$ signal as an address to a random access memory to provide a corresponding $y_{ij}$ signal at the output of the computing element. Each $y_{ij}$ signal delivered to the output has a value that is the inverse of the desired output-distribution function. Each $e_{ij}$ signal, which is a probability distribution function value, is used as an address to select a value corresponding to the inverse of the desired output distribution function.

A derivative output density function, $g_{ij}$ responds to each $e_{ij}$ signal to provide a corresponding $\alpha_{ij}$ signal. Each respective $\alpha_{ij}$ has a value that corresponds to the derivative of the inverse of the probability-distribution function of the desired output signal.

In another alternative embodiment, the memory means further comprises a computer means that responds to each successive value of $u_{ij}$ by computing the probability-density function $f(u_{ij})$. The probability-density function $f(u_{ij})$ is activated by successive $u_{ij}$ signals to provide corresponding scalar signals $v_{ij}$. Each $v_{ij}$ signal has a value corresponding to a point on the probability-density function computed from all past values of $u_{ij}$.

In yet another alternative of the computing element, each value of the activation signal $u_{ij}$ is used to select an address in an $f(u_{ij})$ memory location having an address corresponding to the value of the activation signal $u_{ij}$ to read a value from the $f(u_{ij})$ function corresponding to the probability of $u_{ij}$ at the same address location.

Each $e_{ij}$ signal selects successive addresses in the $g_{ij}$ function to readout $\alpha_{ij}$ signal values for each successive $e_{ij}$ signal. Each $\alpha_{ij}$ signal value selected corresponds to the derivative of the inverse of the desired output distribution function.

A backpropagation summer responds to a backpropagated signal $X_{ij+1}$ through "m" input ports. The $X_{ij+1}$ signal represents an m-dimensional vector; $X_{ij+1}=(x_{1,j+1,p}, x_{2,j+1,p}, x_{3,j+1,p}, \ldots x_{m,j+p,1})^T$. The backpropagation summer sums the elements of each successive $X_{ij}$ signal to provide a scalar $\beta_{ij}$ signal.

A combiner multiplies the value of each successive f-mapped activation signal, $v_{ij}$ times each successive $\alpha_{ij}$ signal, times each successive $\beta_{ij}$ signal to provide a corresponding $p_{ij}$ signal.

PREFERRED EMBODIMENT

Figure 1:
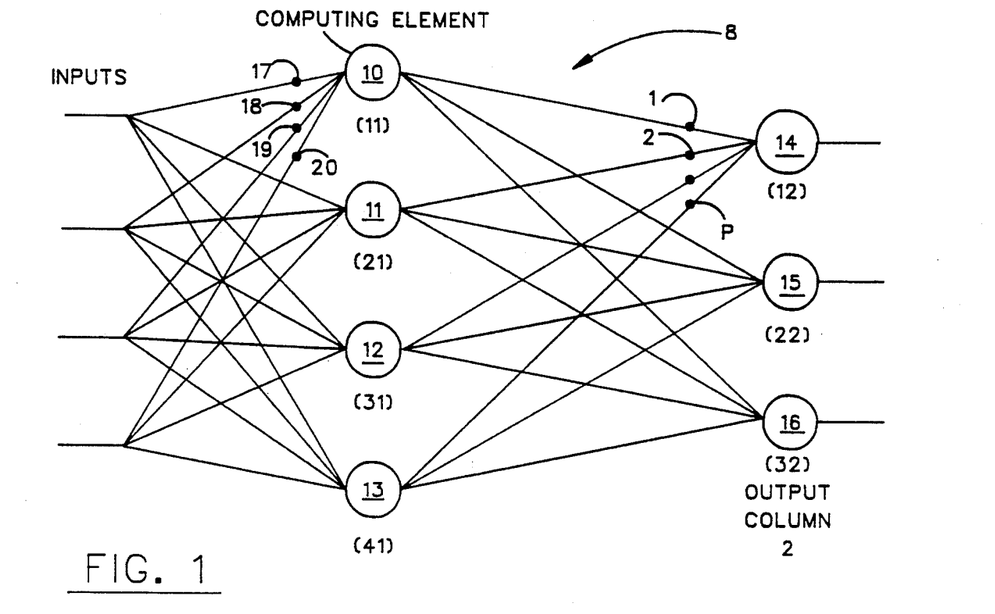
FIG. 1 is a block diagram of a neural network shown as an interconnected array of computing elements.

FIG. 1 is a schematic diagram 8 having a neural network of two layers or columns of computing elements. In general, a neural network is an interconnected array of computing elements such as those represented by circles 10, 11, 12, 13, 14, 15, 16. A computing element, such as computing element 10 combines a parallel input signal vector $S_{ij}=(s_{ij1}, s_{ij2}, s_{ij3}, \ldots, s_{ijK})^T$ on signal lines 17, 18, 19, 20 with a coefficient vector $W_{ij}=(w_{ij1}, w_{ij2}, w_{ij3}, \ldots, w_{ijK})$ developed within the respective computing element to generate an output scalar, $y_{ij}=M_{ij}(u_{ij})$ where $u_{ij}$ is referred to as the activation signal and the values of $u_{ij}$ are obtained from the product of $s_{ij}^T * w_{ij}$. The letter "T" is used to signify the transpose of the vector quantity. The components of $W_{ij}$ are adjustable according to the minimization of some performance criterion Q, such as the minimizing of the sum of the squares of the errors of all the outputs from the neural network. The nonlinear mapping function $M_{ij}$, is a single-valued monotonically nondecreasing function, which may be fixed or variable.

The columns of computing elements forming the neural network are designated by the subscript j where $j=1, 2, \ldots, J$. There are I(j) elements in each column in rows $i=1, 2, \ldots, I(j)$. The computing element at location (i,j) has inputs $s_{ijk}$, where k extends from $k=0$, $1, 2, \ldots, K(j-1)$. Inputs $s_{ij0}=1$ for all i and all j. Each computing element has an output $y_{ij}$.

Typically, the parallel input signal vector, $S_0=(s_{01}, s_{02}, \ldots, s_{0K})^T$, is coupled to the K(0) inputs of each computing element in the input, or first, layer of computing elements. The signal input to the kth input node of the ith computing element in the first column is $s_{i1k}=s_{0k}$. The output signal from the ith computing element in column 1 is $y_{i1}$. The input signal to the kth input of the ith computing element in the second column is $s_{i2k}=y_{k1}$. In general, the input to the kth input of ith computing element in the ith column is $s_{ijk}=y_{kj-1}$.

Figure 4:
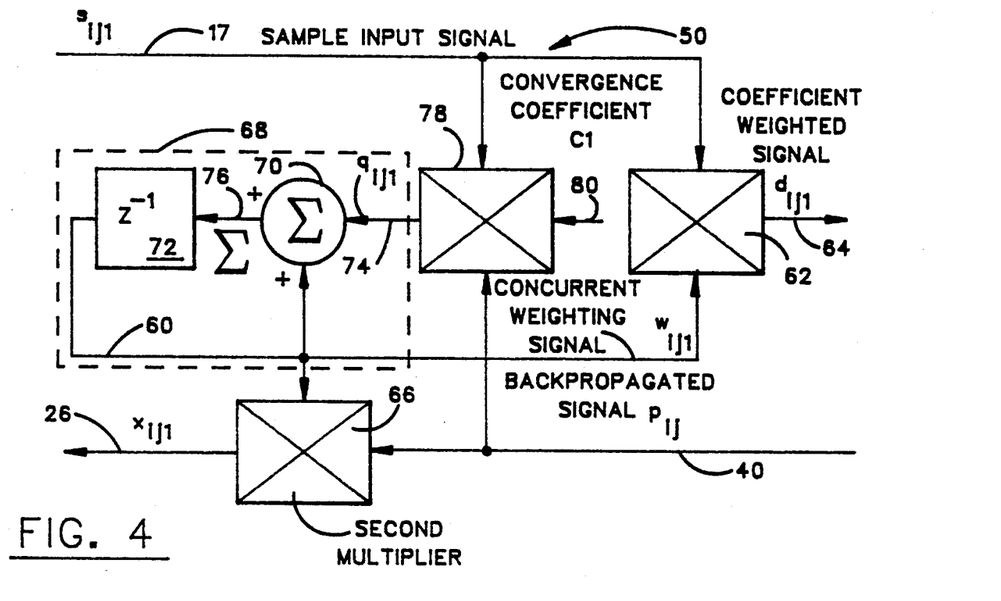
FIG. 4 is a block diagram of a component of the weighting function.

For the purpose of indexing, the value of $K(j)=I(j-1)$; $J=0$ for the source column of signals; $j=1$ for the input column of computing elements and $j=J$ for the output column of computing elements. Each computing element is represented in FIG. 4 by a circle with a multiplicity of bidirectional inputs which connect to every output node of the previous layer and a bidirectional output which fans out to an input of every element in the next layer. Although a two-layer network is shown in FIG. 1, neural networks can be formed that include higher numbers of layers of computing elements.

In a backpropagation network, all signal paths are bilateral. The error in the performance of the neural network is measured, the contribution of each $w_{ijk}$ to that error is determined, and a correction signal is propagated back from the output to be used in the computation of the value of each $w_{ijk}$.

Figure 2:
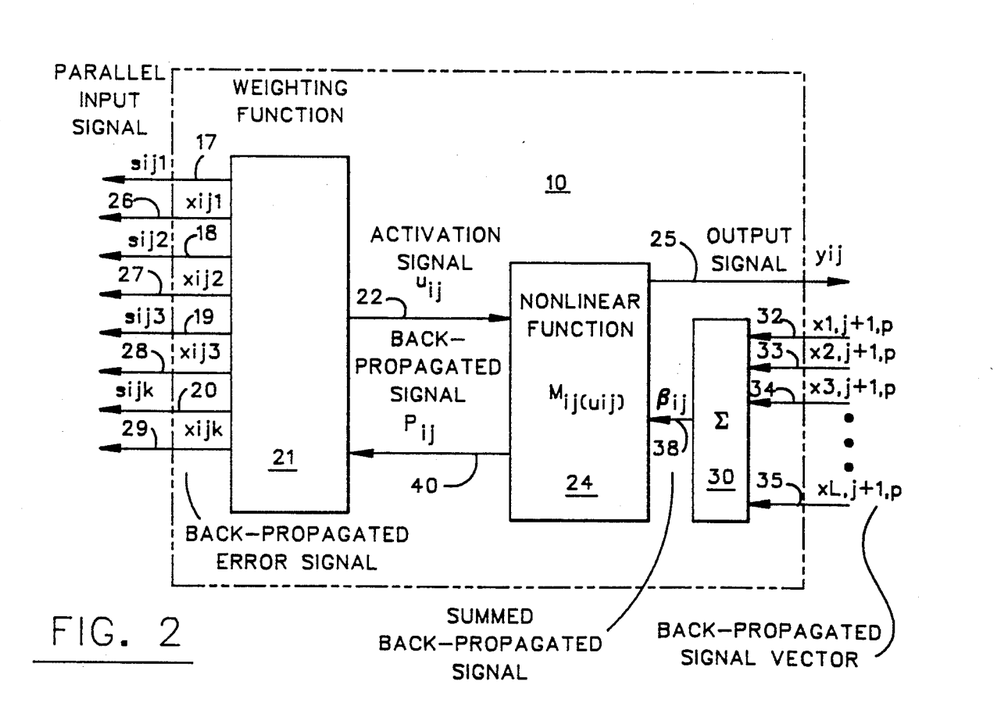
FIG. 2 is a block diagram of a neural network computing element having a first block representing a weighting function and a second block representing a nonlinear function.

FIG. 2 shows a computing element 10 to be composed of two sections or functions: a weighting function 21, which generates activation signal, $u_{ij}$, on signal line 22 and a nonlinear function 24, which generates $y_{ij}$, and outputs $y_{ij}$ on signal line 25. Parallel input signals, $s_{ijk}$ are supplied on signal lines 17, 18, 19, 20 and the backpropagated error signals are outputted on signal lines 26, 27, 28, 29. An m-dimensional backpropagated signal vector, $X_{ij+1}=(x_{1,j+1,p}; x_{2,j+1,p}; x_{3,j+1,p}; \ldots x_{m,j+1,p})^T$ is received by summer 30 on signal lines 32, 33, 34 and 35. Summer 30 is shown coupling the summed backpropagated signal $\beta_{ij}$ to the nonlinear function 24 on signal line 38. The backpropagated signal $p_{ij}$ is shown being coupled from the nonlinear function to the weighting function 21 by signal line 40.

Several neural network theorists have speculated that one of the functions of the nonlinearity within a computing element is to map the inner product of the input vector with its weighting vector to obtain the activation signal, $u_{ij}$, on signal line 22, in a manner to control its amplitude-density function.

If the activation signal, $u_{ij}$, has Gaussian statistics and is scaled such that the full dynamic range is used, then mapping $u_{ij}$ through the "conventional" nonlinearity (the logistic function, $y=[(1+\exp(-u)]^{-1})$ yields a signal output with amplitude statistics that are nearly uniformly distributed.

Because of the greater entropy of such a signal, the network tends to be "livelier" and to respond faster. If a computing element receives many such inputs which are "somewhat" independent, then the next inner product will tend to be "somewhat" Gaussian, and the amplitude-density function controlling or shaping procedure will repeat. If the assumed amplitude statistics are violated, performance becomes comparatively more sluggish.

Figure 3:
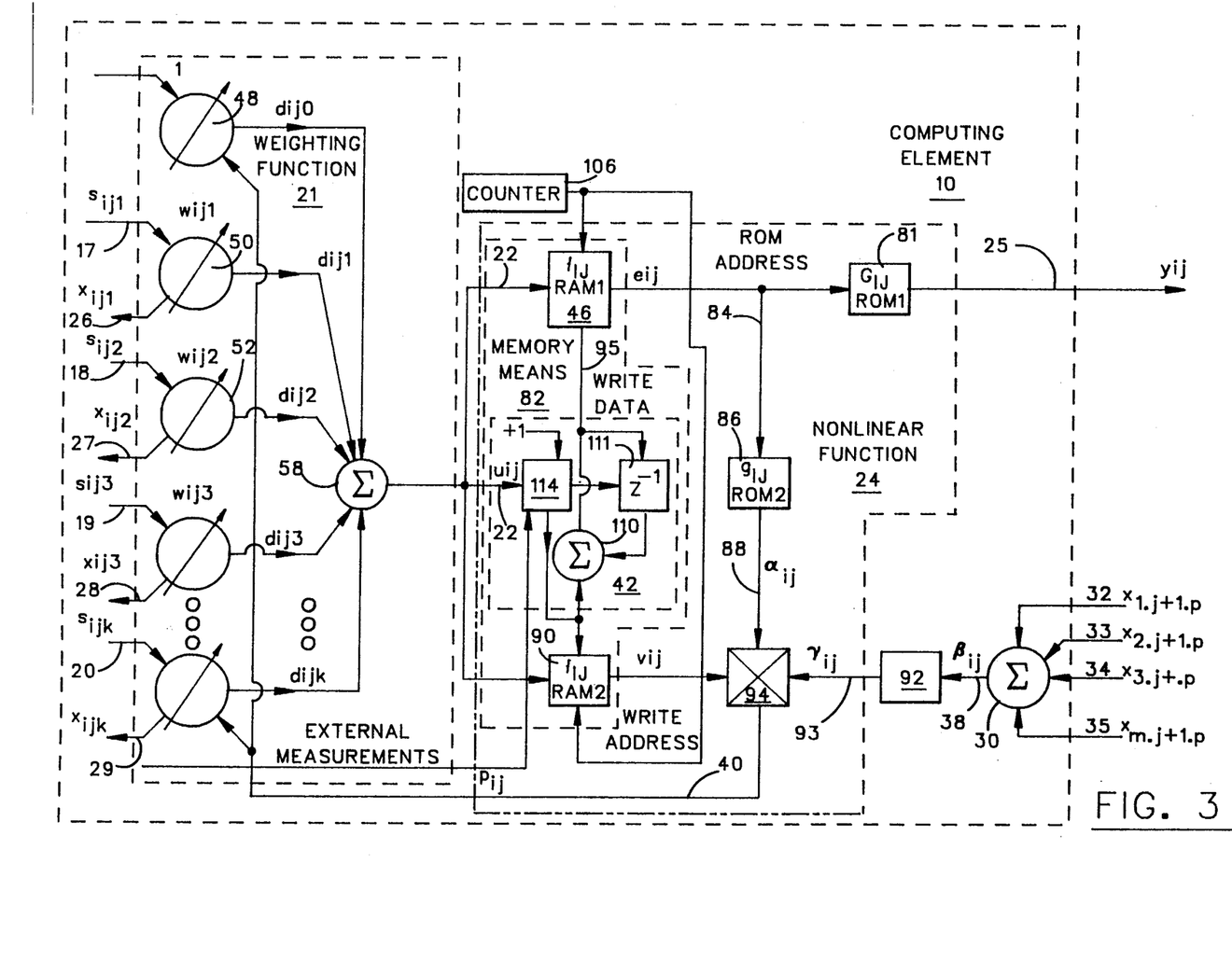
FIG. 3 is an expanded block diagram of a computing element.

The above considerations lead to the embodiment of FIG. 3, which provides a more responsive solution. Phantom box 42 represents a computer, within a memory system 82, for measuring the amplitude statistics of the inner products, i.e. the activation signal $u_{ij}$, on signal line 22, and actively maps them into the desired statistics through nonlinear function 24.

The embodiment of the computing element 10 of FIG. 3 is a "doubly-adaptive" backpropagation computing element. The configuration is termed "doubly adaptive" because both weighting function 21 and nonlinear function 24 are adaptive. The weighting function 21 provides a first level of adaptability by adjusting the gain of the parallel input signals, $s_{ijk}$ on signal lines 17, 18, 19, 20 and the amplitude of the backpropagated error signals on signal lines 26, 27, 28, 29.

The nonlinear function 24 provides a second level of adaptability by adjusting the gain of the bidirectional input signal comprising parallel input signals, $s_{ijk}$ on signal lines 17, 18, 19, 20 and the backpropagated error signal $x_{ijk}$ according to a dynamic performance measure which is transmitted to weighting function 21 by the backpropagated signal $p_{ij}$. The nonlinear function 24 provides a third level of adaptability by adjusting the shape of the nonlinear mapping function $F_{ij}$, provided by the data stored in RAM1 46.

The computer within phantom box 10 is a bidirectional version of the nonlinear adaptive filter described in U.S. Pat. No. 4,843,583, issued Jun. 27, 1989 for "A Nonlinear Adaptive Filter" to S. A. White and V. A. Vitols, and having a common assignee, which is incorporated herein by reference. Two modifications are incorporated into the nonlinear adaptive filter of the '583 patent.

The first modification to the nonlinear adaptive filter of the '583 patent is to replace all frequency-shaping functions within the adaptive loops with unity gain paths; i.e. by replacing each H(z) term with a unity gain path. The second modification is to remove the delay elements from the tapped-delay line and drive the tap points directly with the components of the signal vector which is the input to that neural element. These changes to the nonlinear adaptive filter of the '583 patent provide a unidirectional version of the computing element 10, but do not provide a computing element capable of backpropagation and therefore do not provide a computing element suitable for use in a neural network.

The mathematics of the modified nonlinear adaptive filter were combined with the established mathematics of backpropagation networks to assist in formulating a block diagram of the invention computing element 10.

FIG. 3 is a detailed block diagram of the backpropagation, doubly adaptive computing element. It is "all inclusive" in that any function which may be required at any level in a backpropagation network element has been included. Any known backpropagation neural network may be mechanized entirely using only subsets of the functions and topology of FIG. 3. For each parallel input signal, $s_{ijk}$, to the weighting function 21, there is a backpropagated signal, $x_{ijk} = p_{ij} * w_{ijk}$.

A bilateral scaling unit, such as the weighting function 21, has weighting function elements, such as those in FIG. 3, represented by circles 48, 50, 52, 54, 56 that generate three quantities: (1) a set of backpropagated error signals, $x_{ijk}$, to all elements with which it is connected in the preceding stage; (2) a coefficient weighted signal, $d_{ijk} = s_{ijk} * w_{ijk}$, to be summed with like feedforward signals to generate the activation signal, $u_{ij}$, on signal line 22, to the local nonlinear function 24; (3) an updated concurrent weighting signal $w_{ijk}$ for use within the weighting function element.

There is a bilateral coupling between the weighting function and the nonlinear function. The forward signal is $u_{ij}$, which is simply the sum of the coefficient weighted signals, the $d_{ijk}$'s. The backpropagated signal is $p_{ij}$ on signal line 40 which is generated within the nonlinear function 24.

FIG. 3 shows an embodiment of the weighting function 21 that responds to the concurrent parallel input signals $S_{ij} = (s_{ij1}, s_{ij2}, \ldots, s_{ijK})^T$ and computes a K-dimensional weighting coefficient $W_{ij}$, computes the products $d_{ijk} = s_{ijk} * w_{ijk}$, and computes $u_{ij} = d_{ij1} + d_{ij2} + \ldots + d_{ijK}$ in weighting function summer 58 which is output on signal line 22. Each sequential value of $u_{ij}$ is obtained by computing a K-dimensional weighting-coefficient vector, $W_{ij} = (w_{ij1}, w_{ij2}, \ldots, w_{ijK})^T$ in weighting function elements 48, 50, 52, 54, 56, and by forming the vector inner product of the input signal $S_{ij}$ vector elements and the weighting-coefficient vector, $W_{ij}$ by performing the scalar products to generate $d_{ijk}$ within each of the respective weighting function elements and summing these components within element 58.

The weighting function shown in phantom block 21 also provides a set of external backpropagated error signals $x_{ijk} = P_{ij}$ times $w_{ijk}$ on signal lines 26, 27, 28 and 29 from the output backpropagated signal terminals. The backpropagated signal $p_{ij}$, on signal line 40 is characterized to provide a performance error of all columns of computing elements subsequent to this computing element weighted by the instantaneous gain of the computing element.

FIG. 4 is a block diagram of a weighting function element such as that represented by circle 50 in FIG. 3. The parallel input signal $s_{ij1}$ is sampled on signal line 17 and is multiplied by the concurrent weighting signal $w_{ij1}$ on signal line 60 within the first multiplier 62 to generate the weighted coefficient signal, $d_{ij1}$, on signal line 64. The backpropagated signal $p_{ij}$ on signal line 40 is multiplied by $w_{ij1}$ in second multiplier 66 to generate the backpropagated error signal, $x_{ij1}$, on signal line 26.

The weighting signal $w_{ij1}$ is generated in the accumulator loop 68 comprising summer 70 and delay element 72. Summer 70 combines an update signal $q_{ij1}$ on signal line 74 and the concurrent weighting signal, $w_{ij1}$, on signal line 60 to produce the next sample weighted signal on signal line 76. The sample weighted signal drives the delay element 72. The update signal, $q_{ij1}$, is the output of third multiplier 78. The third multiplier 78 is mechanized to multiply the parallel input signal, $s_{ij}$, on signal line 17, times an internally stored convergence coefficient C1 provided on signal line 80, times the internally backpropagated signal, $p_{ij}$, on signal line 40.

Figure 5:
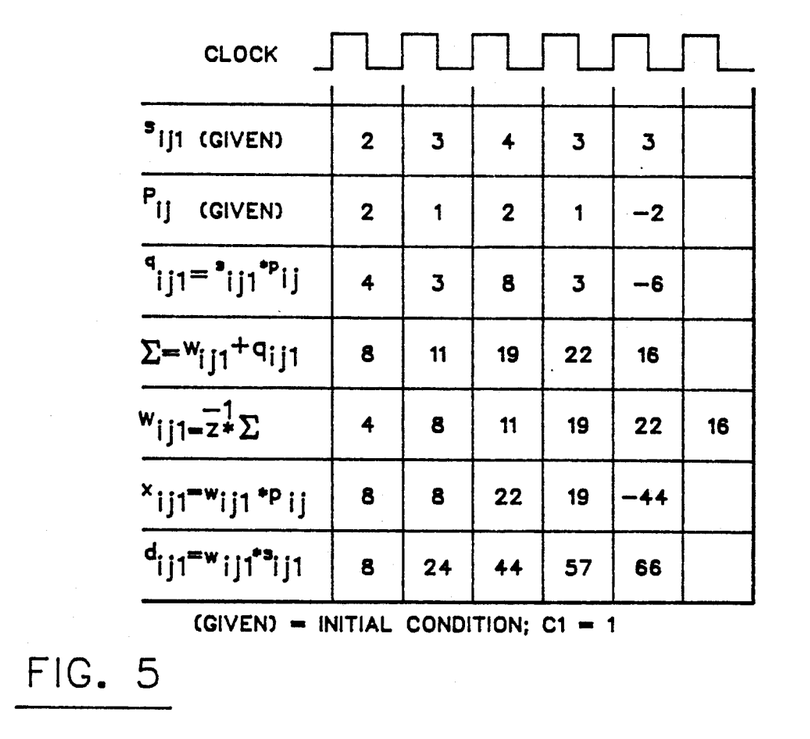
FIG. 5 is a table of values illustrating the values present on particular signal lines within the block diagram of the component of the weighting function of FIG. 4.

FIG. 5 provides an exemplary set of calculations to illustrate the performance of the weighting function element of FIG. 4 for an assumed value of C1=1.0, and an initial set of (GIVEN) initial conditions.

Referring again to FIG. 3, phantom block 24 is a block diagram of a nonlinear function 24 that maps successive values of the activation signal $u_{ij}$ through nonlinear mapping functions $F_{ij}$, provided by the data in RAM1 46, and $G_{ij}$ provided by the data in ROM1, 81 to provide a single-valued output signal $y_{ij}$ at output signal line 25.

The computing element 10 and the nonlinear function 24, through the summer 30, is coupled to receive the m-dimensional backpropagated signal vector, $X_{ij+1} = (x_{1,j+1,p}, x_{2,j+1,p}, x_{3,j+1,p}, \ldots x_{m,j+1,p})^T$ on signal lines 32-35. Each component of the $X_{ij+1}$ backpropagated signal vector originates from the pth weighting function of each computing element in column j+1. The $X_{i,j+1}$ signal vector is characterized to provide a measure of the performance error of all computing elements subsequent to the computing element 10 such as computing elements 14, 15, 16.

Phantom block 82 represents a memory means connected to receive the activation signal $u_{ij}$ via signal line 22. The memory means 82 computes and stores a single-valued monotonic activation function $F(u_{ij})$. The activation function $F(u_{ij})$ is addressed by successive $u_{ij}$ signals to provide a sequence of corresponding scalar signals $e_{ij}$, ($0 \leq e_{ij} \leq 1$). Each $e_{ij}$ signal on signal line 84 has a value that is read out on signal line 84 from an address that corresponds to the value of $u_{ij}$. The value of $e_{ij}$ that is obtained from the memory means 82 in response to each $u_{ij}$ address corresponds to the value or point on the distribution function curve compiled from all past values of the corresponding $u_{ij}$ signal on signal line 22.

ROM1, 81 in FIG. 3, is a first ROM that is preloaded with data that represents the inverse of the desired output distribution function of the output signal $y_{ij}$ on signal line 25. ROM1 is a read only memory that responds to each $e_{ij}$ signal as an address signal by providing a corresponding $y_{ij}$ output signal on output signal line 25. Each $y_{ij}$ output signal that is read out of the first ROM1 81 has an inverse probability value selected in response to the value of the $e_{ij}$ signal. The inverse probability values of $G(e_{ij})$ are initialized before operation, $G(e_{ij})$, by programming to correspond to the desired output distribution function of the output signal $y_{ij}$.

ROM2, 86 in FIG. 3, is a second ROM, that is loaded with data that represents the derivative of the inverse of the output density function. The function $g_{ij}=dG_{ij}(e_{ij})/de_{ij}$ by definition. ROM2 is also addressed by values of $e_{ij}$. Each $e_{ij}$ address signal commands the second ROM 86 to read out a corresponding $\alpha_{ij}$ signal on signal line 88. Each $\alpha_{ij}$ signal that $e_{ij}$ reads out has a value that corresponds to a point on the derivative of the inverse of the probability distribution function of the desired output signal $y_{ij}$ on signal line 25.

Dotted block 42 represents a computer that responds to each successive value of $u_{ij}$ on signal line 22 by computing and updating the corresponding stored value of the probability density function $f(u_{ij})$ in RAM2, 90. The probability density function $f(u_{ij})$ is activated by successive $u_{ij}$ signals which serve as address signals for RAM2 90, which responds by outputting a value from the corresponding address that represents a scalar signal $v_{ij}$ on signal line 91. Each $v_{ij}$ signal has a value that corresponds to a point on the probability density function of $u_{ij}$ computed from all past values of $u_{ij}$ on signal line 22.

Circle 30 in the lower right side of FIG. 3, represents a backpropagation summer connected to signal lines 32-35 to receive the vector components of the input backpropagated signal $X_{ij+1}$. The $X_{ij+1}$ signal represents an m-dimensional vector, $X_{ij+1}=(x_{1,j+1,p}; x_{2,j+1,p}; x_{3,j+1,p}, \ldots x_{m,j+1,p})^T$. The backpropagation summer 30 sums the values of the vector components of each successive $X_{ij+1}$ signal to provide a summed backpropagated signal $\beta_{ij}$ on signal line 38.

In the design of a neural network, such as the network depicted in FIG. 1, and where $j=J$, we are referring to computing elements in the last column. The nonlinearity function characterized by block 92 in FIG. 3 in computing elements in the Jth columns is typically a function selected to control the performance criterion, Q, described above, to which the unit adapts.

The shape of the nonlinearity, such as a signum function, is predetermined to be the derivative of the performance criteria, Q, with respect to the error at the output. The error at the ith output is $\beta_{ij}$ where the inputs to the summer 30 are defined as:

$$x_{1,J+i,p} = -y_{iJ}$$

$x_{2,J+1,p}$ = an externally supplied reference; and $$x_{n,J+1,p} = 0 \text{ for all } n > 2.$$

If $j=J$, then $y_{ij}=\beta_{ij}$ and element 92 is simply a unity gain function.

Block 94, in FIG. 3, represents a combiner that multiplies the value of each successive $\gamma_{ij}$ signal times each successive $\alpha_{ij}$ signal times each successive $v_{ij}$ signal to provide a corresponding backpropagated signal $p_{ij}$.

The $e_{ij}$ signal on signal line 84 selects successive addresses in the ROM2, 86, storing the values generated by operation of the $g_{ij}$ function, to readout $\alpha_{ij}$ signal values on signal line 88. Each $\alpha_{ij}$ signal value corresponds to the derivative of the inverse of the desired output distribution function corresponding to the value of the $e_{ij}$.

The combiner or multiplier, 94 scales signal $\gamma_{ij}$ on signal line 93 from the conditional nonlinearity 92 by the instantaneous feedforward gain, i.e. $\alpha_{ij}*v_{ij}$, of the nonlinear function 24 to provide the backpropagated signal $p_{ij}$ on signal line 40. The backpropagated signal $p_{ij}=\gamma_{ij}(\alpha_{ij}*v_{ij})$, where $(\alpha_{ij}*v_{ij})$ is the instantaneous feedforward gain of the nonlinear function 24.

The expression for the gain of the nonlinear function 24 is obtained from FIG. 3 by observing that:

The output of block 81 is:

$$y_{ij}=G_{ij}(e_{ij}) \tag{1}$$

The output of block 46 is:

$$e_{ij}=F_{ij}(u_{ij}) \tag{2}$$

In general, the gain of any function having an output $y_{ij}$ and an input signal $u_{ij}$ is obtained from the relationship:

$$Av=dy_{ij}/du_{ij} \tag{3}$$

Differentiating equations (1) and (2) provides:

$$dy_{ij}=(dG_{ij}(e_{ij})/de_{ij})*de_{ij} \tag{4}$$

$$de_{ij}=(dF_{ij}(u_{ij})/du_{ij})*du_{ij} \tag{5}$$

Block 86 is defined as:

$$dG_{ij}(u_{ij})/de_{ij}=g_{ij}(e_{ij}) \tag{6}$$

and block 90 is defined as:

$$dF_{ij}(u_{ij})/du_{ij}=f_{ij}(u_{ij}) \tag{7}$$

By combining (4) and (6)

$$dy_{ij}=g_{ij}(e_{ij})*de_{ij} \tag{8}$$

and by combining (5) and (7)

$$de_{ij}=f_{ij}(u_{ij})*du_{ij} \tag{9}$$

From (8) and (9)
$$dy_{ij}=g_{ij}(e_{ij})*f_{ij}(u_{ij})*du_{ij} \tag{10}$$

But by definition:

$$\alpha_{ij}=g_{ij}(e_{ij}) \tag{11}$$

and $$v_{ij}=f_{ij}(u_{ij}) \tag{12}$$

By combining (10), (11) and (12):

$$dy_{ij}/du_{ij}=g_{ij}(e_{ij})*f_{ij}(u_{ij}) \tag{13}$$

From equations (3) and (13) therefore:

$$Av=\alpha_{ij}*v_{ij}$$

Figure 6:
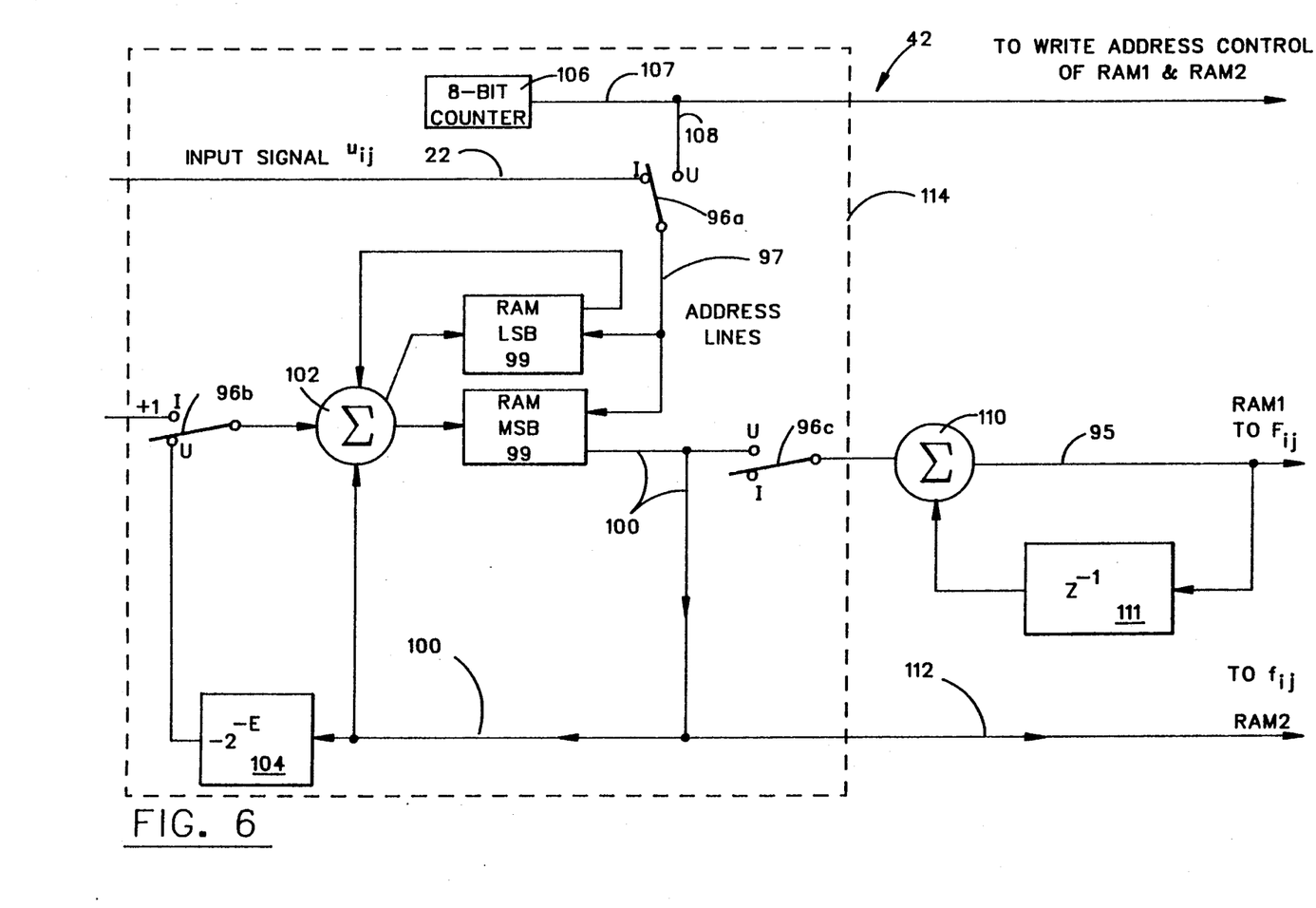
FIG. 6 is a block diagram of the computer for calculating values for the $f_{ij}$ and $F_{ij}$ RAMs within the memory system in the block diagram of the nonlinear function of FIG. 4.

FIG. 6 is a block diagram of a particular embodiment of the computer shown in FIG. 3 as phantom box 42. The computer is characterized to respond to each successive value of $u_{ij}$ on signal line 22 by computing and updating the single-valued monotonic activation function $F(u_{ij})$ via signal path 95.

The operational process of this embodiment is explained by examining the sequence of steps that occur with the selector switches 96a, 96b, 96c in each of two possible positions; i.e. position I for the input cycle and position U for the update cycle.

With the switches in the I position, the activation signal $u_{ij}$ passes along lines 22, through switch 96a to signal line 97 and then to the address bus of the LSB RAM 98 and the address bus for the MSB RAM 99. These RAMS are part of the same memory; the LSB RAM 98 being storage for the least significant bits and MSB RAM 99 being storage for the most significant bits of the same data word or value.

As each RAM address is selected by $u_{ij}$, the value of the data word stored in the RAM MSB 99 at that address is read out on lines 100 and fed to the summer 102 and to the input of the $-2^{-E}$ block 104. With switch 96b in the I position, 1 is added to the value fed to the summer 102 from RAM MSB 99 via signal line 100. The number stored at the RAM MSB 99 and RAM LSB 98 address is reloaded back into the same address with a 1 bit increase.

The switches 96a, 96b, 96c are transferred to the U position for update. The counter, 106 is advanced one count to select the next address in sequence and the RAM MSB 99 and the RAM LSB 98 are addressed by this address via switch 96a in position U. The value of the number in the RAM MSB 99 at that sequential address is then fed via line 100 to the input of the $-2^{-E}$ block 104. This block, in conjunction with the direct feedback input to the adder 102, multiplies the value received on signal line 100 by $1-2^{-E}$, a number of less than 1, thereby diminishing the magnitude of the number received. The diminished value of the number that was in the RAM MSB 99 address location is then fed via switch 96b in the U position to the summer 102 and reloaded as a new value into the RAM MSB 99 and RAM LSB 98 at the selected address.

The value selected for E in the mechanization of the $-2^{-E}$ block 104 function is application dependent and establishes the time constant of the run down of the value in the RAM MSB 99 and RAM LSB 98 selected location addressed by the counter 106 via signal lines 107, 108, switch 96a and signal line 97 in the RAM MSB 99 and RAM LSB 98.

The $1-2^{-E}$ multiplier, mechanized by block 104, line 100, and summer 102, operates as the feedback gain in a low pass filter and keeps the values of the data stored in locations of the RAM MSB 99 and RAM LSB 98 from overflowing. The value of the output of RAM MSB 99 is also fed to the accumulator 110, via switch 96c in the U position. The accumulator 110 operates with delay 111 to accumulate the amplitude density function $F_{ij}$ and output the value of the amplitude distribution function on signal line 95 to the appropriate address of RAM1.

The output of the RAM MSB 99 is also fed via signal line 112 to the same address of RAM2. Phantom block 114 characterizes the memory and control means function of the computer means 42, for receiving the activation signal, scaling, storing and controlling the process to provide update signals for the amplitude-density storage function 90 and the amplitude distribution storage function 46.

I claim:

1. A computing element comprising:
    a weighting function means responsive to a sequence of successive sets of corresponding sample input signals, each successive signal having vector elements $s_{ij1}$, $s_{ij2}$, ... $s_{ijk}$ for providing a sequence of activation signals, $u_{ij}$, at an output, said weighting function means comprising at least two weighting function element,
    each having a first input responsive to a corresponding sample input signal vector element, and a second input responsive to a series of backpropagated signals ($p_{ij}$);
    each weighting function element being configured to:
        accumulate the successive products of each successive corresponding sample input signal $s_{ijk}$ times a concurrent backpropagated signal, to form a concurrent weighting coefficient signal, and
        to multiply successive corresponding sample input signal vector elements by the concurrent weighting coefficient signal to provide a weighted input signal; and
    summation means for summing the concurrent weighted input signals from each weighting function element to provide a series of activation signals $u_{ij}$;
    an adaptive nonlinear processor having an input responsive to the series of activation signals and preselected network signals, and an output, comprising:
    a first processor coupled to receive said activation signals and update the contents of a first RAM which is configured to provide a sequence of first signal samples and a sequence of second signal samples in response to said activation and network signals; wherein,
        each said first signal sample has a value representing a point on the amplitude distribution function of said corresponding activation signal sample;
        each said second signal sample has a value representing the amplitude density function of said corresponding network signal sample,
    a second processor coupled to receive each said first signal sample
    and to provide an output signal representing a point on the inverse of the desired output amplitude-distribution function of the corresponding first signal sample; and,
    control means for receiving said each first signal sample and generating a corresponding control signal sample, each control signal sample having a value representing a point on the derivative of the inverse of the desired output amplitude-distribution function of the output signal sequence;
    summation means having an plurality of inputs coupled to receive a plurality of respective backpropagated signals for providing a summed backpropagated signal; and
    combination means having first input responsive to said control signal, a second input responsive to said second signal sample, a third input responsive to said backpropagated signal, for multiplying said first control signal, said second signal sample and said backpropagated signal to provide said internal backpropagated signal, $p_{ij}$, to said weighting function means.

2. The signal processor of claim 1 wherein said nonlinear processor further comprises a second RAM, the second RAM being addressed by said activation signal for providing a second signal sample corresponding to each activation signal, the value of each second signal sample corresponding to a point on the amplitude density function of the past activation signal $u_{ij}$.

3. An adaptive computing element for use in a network of at least two computing elements arrayed in a predetermined number of (i) rows and (j) columns as determined by a preselected processing size for the network, each computing element comprising:

a plurality of input-signal terminals connected to receive concurrent input signals, a same number of output backpropagated signal terminals, at least one element output signal terminal for connecting said element to other network nodes, and a plurality of input backpropagated signal terminals connected to receive backpropagated network signals from each network node to which said output terminal is connected which provide a measure of the performance error of said adaptive computing element, each computing element further comprising:

bilateral scaling means for receiving and adjusting the gain of said concurrent input signals in response to an internal backpropagation signal and for generating a scalar activation signal therefrom, and for providing a plurality of network feedback signals on said output backpropagated signal terminals by adjusting the gain of said internal backpropagated error signal; and adaptive nonlinear means for receiving and altering an amplitude density of said scalar activation signal in response to a preselected network control signal for providing a single-valued element output signal at each output terminal, and for receiving and scaling said input backpropagated signals by the instantaneous feedforward gain of the adaptive nonlinear means so as to generate said internal backpropagated performance error signal therefrom.

4. The apparatus of claim 3 wherein said bilateral scaling means comprises:

weighting means for applying weighting coefficients to said concurrent input signals and said internal backpropagated performance error signal; and summation means for summing weighted input signals to form said scalar activation signal.

5. The apparatus of claim 4 wherein said adaptive nonlinear means comprises output means connected to receive said activation signal for providing a corresponding element output signal which is an inverse probability value corresponding to a desired output distribution function.

6. The apparatus of claim 5 wherein said output means comprises a ROM.

7. The apparatus of claim 5 wherein said output means comprises:

memory means connected to said weighting means for receiving said activation signal and for compiling values thereof, and for providing scalar intermediate output signals corresponding to values on a distribution curve compiled from all previous values of said activation signals; and inverse distribution means connected to receive each intermediate output signal for providing a corresponding output which is an inverse probability value corresponding to the desired output distribution function.

8. The apparatus of claim 7 wherein said inverse distribution means comprises a first ROM containing prestored inverse probability values and connected to receive said intermediate output signals as addresses for recalling said prestored values.

9. The apparatus of claim 7 wherein said memory means comprises a first RAM connected to receive and store compiled activation signal data as said distribution curve data.

10. The apparatus of claim 9 wherein said memory means comprises an accumulator connected to receive said activation signal for compiling values thereof and connected to said first RAM for transferring said accumulated values to predetermined address locations, as said distribution curve data, and said first RAM having address selection inputs connected to said weighting means for receiving said activation signals as address values.

11. The apparatus of claim 10 wherein said nonlinear means comprises;

measuring means for determining an amplitude density function for said preselected neural network signal; and adjusting means connected to said RAM for adjusting data stored therein in response to changes in said amplitude distribution function values.

12. The apparatus of claim 7 further comprising;

backpropagation summation means for summing said input backpropagation signals into a scaler backpropagation signal; and combination means for forming a product of said instantaneous feedforward gain and each successive scaler backpropagation signal to provide said corresponding internal backpropagated signal.

13. The apparatus of claim 12 further comprising second nonlinear means for applying a conditional nonlinearity to said internal backpropagated signals in response to said intermediate output signals and said network control signal.

14. The apparatus of claim 13 wherein said second nonlinear means comprises:

backpropagation summation means for summing said input backpropagation signals into a scaler backpropagation signal;

derivative inverse means connected to said memory means for providing a corresponding scalar signal representing a point on the derivative of the inverse of the probability distribution of the desired output signal in response to each intermediate output signal;

probability means connected to receive said activation signals for generating and compiling a probability density function for said activation signals;

selecting means connected to receive said activation signals for selecting a scalar probability density signal for each successive activation signal from said compilation of all past values for said activation signals; and multiplication means for forming a product of said inverse of the probability distribution, and derivative of the inverse of the probability distribution scalar signals and said summed backpropagation signals to provide said corresponding internal backpropagated signal.

15. The apparatus of claim 14 wherein:

said derivative inverse means comprises a second ROM storing preselected values for the derivative of the inverse of the probability distribution of the desired output signal at addresses corresponding to values of said intermediate output signals; and said probability means comprises a second RAM storing preselected probability density function values at addresses corresponding to values of said activation signals.

16. The apparatus of claim 4 wherein said weighting means further comprises biasing means for applying an offset bias to said activation signals.

17. The apparatus of claim 4 wherein said nonlinear means comprises:

an accumulator connected to receive said activation signals from said weighting means and configured to compile values thereof;

a first RAM connected to an output of said accumulator so as to receive and store compiled activation signal data in predetermined address locations, as said distribution curve data, said first RAM also having address selection inputs connected to said weighting means for receiving said activation signals as address values which provides scalar intermediate output signals corresponding to values on said distribution curve;

a first ROM containing prestored inverse probability values and connected to receive said first RAM output signals as addresses for recalling said prestored values so as to form element output signals;

backpropagation summation means for summing said input backpropagation signals into a scaler backpropagation signal;

a second ROM connected to said first RAM containing preselected values for the derivative of the inverse of the probability distribution of the desired output signal at addresses corresponding to values of said intermediate output signals;

a second RAM connected to receive said activation signals having preselected probability density function values stored therein at addresses corresponding to values of said activation signals; and a multiplier connected to outputs of each of said summation, second RAM, and second ROM, so as to generate said corresponding internal backpropagated signal as a product of said inverse of the probability distribution, and derivative of the inverse of the probability distribution scalar signals and said summed backpropagation signals.

18. A method of performing adaptive nonlinear computations in a computing element within a neural network of computing elements comprising the steps of:

receiving and adjusting the gain of a sequence of concurrent input signals in response to internal backpropagation error signals;

generating a same number of output backpropagated signals, by adjusting the gain of said internal backpropagated error signals;

generating a scalar activation signal from said scaled input signals;

receiving and altering an amplitude density of said scalar activation signal in response to a preselected network control signal so as to provide a single-valued element output signal to other network nodes;

receiving a plurality of input backpropagated network signals from each network node to which said output is transferred which provide a measure of the performance error of said adaptive computing element; and scaling said input backpropagated signals by the instantaneous feedforward gain associated with said nonlinear computations so as to form said internal backpropagated performance error signal therefrom, which provides a measure of the performance error of all computing elements subsequent to said computing element.

19. The method of claim 18 wherein said steps of receiving and adjusting and generating an activation signal, comprise the steps of:

applying weighting coefficients to said concurrent input signals and said internal backpropagated performance error signal; and summing said weighted input signals to form said scalar activation signal.

20. The method of claim 18 wherein said receiving and altering an amplitude density step, comprises the steps of:

receiving said activation signals and compiling values thereof;

providing scalar intermediate output signals corresponding to values on a distribution curve compiled from all previous values of said activation signals; and providing a corresponding output for each intermediate output signal which is an inverse probability value corresponding to a desired output distribution function.

21. The method of claim 18 wherein said providing step comprise the steps of:

storing compiled activation signal data as said distribution curve data in a first RAM at predetermined address locations;

applying said activation signals as address values to said first RAM so as to recall said prestored data as intermediate output signals;

storing inverse distribution values in a first ROM; and applying said intermediate output signals as address values to said first ROM so as to recall said prestored values as output signals.

22. The method of claim 21 further comprising the step of updating said first and second RAM data in response to a preselected network signal.

23. The method of claim 21 further comprising the steps of:

summing said input backpropagation signals into a scaler backpropagation signal;

storing preselected values for the derivative of the inverse of the probability distribution of the desired output signal in a second ROM connected to said first RAM at addresses corresponding to values of said intermediate output signals;

storing preselected probability density function values in a a second RAM connected to receive said activation signals at addresses corresponding to values of said activation signals; and generating a product of the outputs of each of said summation, second RAM, and second ROM, so as to form said corresponding internal backpropagated signals.

24. The method of claim 18 further comprising the steps of:

summing said input backpropagation signals into a scaler backpropagation signal; and forming a product of said instantaneous feedforward gain and each successive scaler backpropagation signal so as to provide said corresponding internal backpropagated signal.

* * * * *